US008611070B2

(12) United States Patent
Ivanovici et al.

(10) Patent No.: US 8,611,070 B2
(45) Date of Patent: Dec. 17, 2013

(54) PROCESS FOR ENCAPSULATING METALS AND METAL OXIDES WITH GRAPHENE AND THE USE OF THESE MATERIALS

(75) Inventors: Sorin Ivanovici, Heidelberg (DE); Shubin Yang, Mainz (DE); Xinliang Feng, Mainz (DE); Klaus Müllen, Köln (DE)

(73) Assignees: BASF SE, Ludwigshafen (DE); Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 228 days.

(21) Appl. No.: 13/107,278

(22) Filed: May 13, 2011

(65) Prior Publication Data
US 2011/0292570 A1  Dec. 1, 2011

Related U.S. Application Data

(60) Provisional application No. 61/334,588, filed on May 14, 2010.

(51) Int. Cl.
*H01G 9/00* (2006.01)
(52) U.S. Cl.
USPC ........... 361/502; 361/503; 361/504; 361/509; 361/512; 361/518
(58) Field of Classification Search
USPC ................ 361/502–504, 508, 512, 516–519; 252/503, 506–508, 514
See application file for complete search history.

(56) References Cited

U.S. PATENT DOCUMENTS

| 2011/0143107 A1 | 6/2011 | Steinig-Nowakowski et al. |
| 2011/0186789 A1* | 8/2011 | Samulski et al. ............. 252/514 |

FOREIGN PATENT DOCUMENTS

| WO | WO 2011/082961 A2 | 7/2011 |
| WO | WO 2011/131722 A1 | 10/2011 |

OTHER PUBLICATIONS

U.S. Appl. No. 13/091,674, filed Apr. 21, 2011, Ivanovici, et al.
Wei-Ming Zhang, et al., "Tin-Nanoparticles Encapsulated in Elastic Hollow Carbon Spheres for High-Performance Anode Material in Lithium-Ion Batteries", Advanced Materials, vol. 20, 2008, pp. 1160-1165.
Hyesun Kim, et al., "Superior Lithium Electroactive Mesoporous Si@Carbon Core-Shell Nanowires for Lithium Battery Anode Material", Nano Letters, vol. 8, No. 11, 2008, pp. 3688-3691.
Guanglei Cui, et al., "A Germanium-Carbon Nanocomposite Material for Lithium Batteries", Advanced Materials, vol. 20, 2008, pp. 3079-3083.
International Preliminary Report on Patentability and Written Opinion issued Nov. 29, 2012 in Application No. PCT/EP2011/057563.
Jane Yao, et al., "In Situ chemical synthesis of $SnO_2$-graphene nanocomposite as anode materials for lithium-ion batteries", Electrochemistry Communications, vol. 11, 2009, pp. 1849-1852.
Norman A. Luechinger, et al., "Surfactant-Free, Melt-Processable Metal-Polymer Hybrid Materials: Use of Graphene as a Dispersing Agent", Adv. Mater., vol. 20, 2008, pp. 3044-3049.
Q. Ou, et al., "Characteristics of graphene-layer encapsulated nanoparticles fabricated using laser ablation method", Diamond and Related Materials, vol. 17, 2008, pp. 664-668.
Yunfeng Lu, et al., "Continuous formation of supported cubic and hexagonal mesoporous films by sol-gel dip-coating", Nature, vol. 389, 1997, pp. 364- 368.

* cited by examiner

*Primary Examiner* — Nguyen T Ha
(74) *Attorney, Agent, or Firm* — Oblon, Spivak, McClelland, Maier & Neustadt, L.L.P.

(57) ABSTRACT

The invention relates to a process for coating nanoparticles with graphene, comprising the steps of
 (a) providing a suspension comprising a suspension medium and nanoparticles with positive surface charge,
 (b) adding graphene oxide particles to the suspension from step (a), the graphene oxide particles accumulating on the nanoparticles, and
 (c) converting the graphene oxide particles accumulated on the nanoparticles to graphene,
to graphene-coated nanoparticles comprising at least one metal, a semimetal, a metal compound and/or a semimetal compound, and to the use of these graphene-coated nanoparticles in electrochemical cells and supercapacitors, and to supercapacitors and electrochemical cells comprising these nanoparticles.

16 Claims, No Drawings

PROCESS FOR ENCAPSULATING METALS AND METAL OXIDES WITH GRAPHENE AND THE USE OF THESE MATERIALS

This patent application claims the benefit of pending U.S. provisional patent application Ser. No. 61/334,588 filed May 14, 2010 incorporated in its entirety herein by reference.

The present invention relates to nanoparticles which are formed from a core comprising at least one metal, a semimetal, a metal compound and/or a semimetal compound and at least one coating of graphene. These nanoparticles are suitable especially as materials which store lithium ions in the electrodes of lithium ion accumulators and supercapacitors. The present invention further relates to a process for producing these nanoparticles, to the use thereof in electrochemical cells and to electrochemical cells and double layer capacitors comprising the nanoparticles.

There is a great demand for batteries and accumulators as power sources in portable devices such as digital cameras and notebooks. For this purpose, the batteries and accumulators should have a maximum energy density and a maximum lifetime. An additional factor for the accumulators is that they should be able to pass through a maximum number of charge/discharge cycles without any decrease in their capacity.

Lithium has the highest negative potential of all chemical elements. Batteries and accumulators with a lithium-based anode therefore have very high cell voltages and very high theoretical capacities. Among the lithium-based accumulators, lithium ion accumulators have particular advantages, since they do not comprise any metallic lithium which can react with the electrolytes present in the accumulators and thus lead to safety problems.

In a lithium ion accumulator, the cell voltage is generated by the movement of lithium ions. The anode materials used for lithium ion accumulators are typically compounds which can store lithium ions, for example graphite. Recently, due to their high capacities, further electrochemically active metals, semimetals and compounds thereof, such as Sn, Si, Ge, $Co_3O_4$ and $Fe_2O_3$, have been considered as anode-active materials for lithium ion accumulators (Zhang. W. M., et al, Adv. Mater. 2008, 20, 1160; Kim H., et al, Nano letter 2008, 8, 3688; Cui G. L., et al, Adv. Mater. 2008, 20, 3079). However, a problem with the use of materials which store lithium ions as anode-active materials is the great change in the specific volume thereof which occurs during a charge/discharge cycle. This causes partial pulverization of the anodes, which leads to lower electrical conductivities and lower reversible capacities. In order to circumvent this problem, the anode-active substances can be embedded into graphene. In this case, the anode-active substances are distributed on the surface of the graphene or between the graphene layers. This does indeed achieve an improvement. Graphene can buffer the great changes in volume during the charge/discharge cycles and also maintain the high conductivity in the electrode. After a certain number of charge/discharge cycles, however, agglomeration of the metals, semimetals or compounds thereof occurs, since they are present essentially on the surface of the graphene or between large graphene layers. This likewise leads eventually to reduced conductivities and reduced capacities.

It is an object of the present invention to provide materials which can be used as anode-active materials in lithium ion batteries and have a high capacity which remains stable even over a large number of charge/discharge cycles.

This object is achieved in accordance with the invention by nanoparticles comprising at least one component A selected from the group consisting of metals, semimetals, metal compounds and semimetal compounds and at least one coating of graphene.

The invention further provides a process for producing these nanoparticles, comprising the steps of
(a) providing a suspension comprising a suspension medium and nanoparticles with positive surface charge, comprising at least one component A,
(b) adding graphene oxide particles to the suspension, the graphene oxide particles accumulating on the nanoparticles, and
(c) converting the graphene oxide particles accumulated on the nanoparticles to graphene, and to the use of the inventive nanoparticles as material which stores and/or releases lithium ions in electrochemical cells, and also electrochemical cells and supercapacitors comprising the inventive nanoparticles.

The inventive nanoparticles are formed from a core comprising at least one component A and at least one coating of graphene, which coats or encapsulates the core. Graphene possesses not only a very good electrical conductivity but also a high structural flexibility, and therefore withstands the change in volume which occurs during a charge/discharge cycle in the at least one component A present in the core of the nanoparticles, without significant impairment of its structure.

The at least one component A present in the nanoparticles is completely screened by the coating of graphene from the at least one component A present in other nanoparticles. During the charge/discharge of a lithium ion accumulator with an anode which comprises the inventive nanoparticles as anode-active material, there is essentially no agglomeration of the at least one component A present in each of the nanoparticles. The high capacity of such an anode is thus preserved over a very large number of charge/discharge cycles. The graphene present as a coating in the nanoparticles additionally ensures a very good conductivity in the overall electrode.

It has been found that, surprisingly, anodes which comprise the inventive nanoparticles as anode-active material have a higher capacity than anodes which comprise the at least one component A used substance alone, graphite alone or mechanical mixtures of graphite and of the substance used as component A, or would be expected in the case of proportional addition of the particular capacities. This is shown in the examples with reference to $Co_3O_4$ as component A. The capacity of an anode which comprises $Co_3O_4$ in the core and graphene as the coating is virtually unchanged even after a large number of charge/discharge cycles, whereas anodes which comprise only $Co_3O_4$ or a mechanical mixture of graphene and $Co_3O_4$ exhibit a distinct decrease in capacity with rising number of cycles.

The process according to the invention for producing the inventive nanoparticles is a very easily performable process which proceeds from the comparatively inexpensive raw material graphene oxide. This process can produce nanoparticles with a particularly high proportion of component A and a comparatively low proportion of graphene coating. This is especially advantageous in the case of nanoparticles which are used as anode material in lithium ion accumulators, since an increase in the proportion of anode-active component A in the nanoparticles causes an increase in the reversible capacity of the anode.

The invention is explained in detail hereinafter.

In the context of the present invention, "graphite" means carbon formed from many flat layers layered one on top of another, which are formed from condensed six-membered rings of $sp^2$-hybridized carbon atoms. Strictly speaking, "graphene" is understood to mean a single carbon layer of the graphite structure, i.e. a single layer of hexagonally arranged fused rings consisting of six carbon atoms with $sp^2$-hybridization. According to the invention, "graphene", however, also refers to materials which are formed from up to 10 layers, preferably from up to 5 layers, more preferably from up to 2 layers and especially from 1 layer of hexagonally arranged fused rings consisting of six $sp_2$-hybridized carbon atoms.

In the context of the present invention, "graphite oxide" is understood to mean a three-dimensional structure formed from layers, the individual layers of which consist of fused $C_6$ rings partly functionalized with carbonyl, carboxyl, alcohol and epoxy groups. The individual layers therein are no longer flat as in graphite, but rather project partially or completely, according to the degree of oxidation, out of the plane in zigzag form.

According to the invention, "graphene oxide" is understood to mean materials which are formed from up to 10 layers, preferably from up to 5 layers, more preferably from up to 2 layers and especially from a single layer, which are formed from fused $C_6$ rings which bear oxygen-functional groups such as epoxy, alcohol, carboxyl and/or carbonyl groups.

An "accumulator" in the context of the invention means a rechargeable electrochemical cell, also known as a secondary cell.

According to the invention, a "battery" refers to a non-rechargeable electrochemical cell, also known as a primary cell.

"Supercapacitors", also known as ultracapacitors, are double-layer capacitors which comprise essentially two electrodes wetted with an electrolyte. On application of a voltage below the clogging voltage of the electrolyte, ions of reverse polarity collect at the two electrodes. The two electrodes with the charge carrier layers behave like two capacitors connected in series. They store energy electrostatically—in contrast to batteries and accumulators.

In the context of the present invention, "anode" refers to the negatively charged electrode of the electrochemical cell. At the negative electrode, reduction takes place in the course of charging of an accumulator; in a lithium ion accumulator, lithium ions are stored at the anode in the course of the charging operation. In the course of discharge, oxidation takes place at the negative electrode; in a lithium ion accumulator, the lithium ions stored are released at the same time.

In the context of the present invention, the term "anode-active material" or "cathode-active material" refers to materials, compounds and/or substances which can be used as electrochemically active materials/compounds/substances in the anode or the cathode of lithium ion accumulators, especially as materials/compounds/substances which store lithium ions. These may be individual compounds, materials or substances, but mixtures of different materials/compounds/substances may also be encompassed thereby.

The inventive nanoparticles are formed from a core and at least one coating of graphene, said core comprising at least one component A, and said core preferably consisting of the at least one component A, such that the inventive nanoparticles comprise a core consisting of the at least one component A and at least one coating of graphene. The inventive nanoparticles further comprise at least one coating of graphene which substantially, preferably completely, coat the core. The nanoparticles preferably consist of a core comprising at least one component A and a coating of graphene; the inventive nanoparticles more preferably consist of a core consisting of at least one component A and a coating of graphene.

According to the invention, the at least one component A is selected from the group consisting of metals, semimetals, metal compounds and semimetal compounds; the at least one component A is preferably selected from the group consisting of metals, semimetals, metal compounds and semimetal compounds which store and/or release lithium ions, especially from the group consisting of anode-active and cathode-active metals, semimetals, metal compounds and semimetal compounds. Among the metal and semimetal compounds, particular preference is given to the oxides and mixed oxides. Especially preferably, the at least one component A is selected from the group consisting of Sn, Ge, Si, Pb, $Co_3O_4$, CuO, $SnO_2$, SnO, NiO, $MoO_2$, $TiO_2$, $Fe_3O_4$, $Fe_2O_3$, $SiO_2$, $HfO_2$, $ZrO_2$, $Al_2O_3$, ZnO, $LiFePO_4$, $MnO_2$, $RuO_2$ and Li-containing oxides and mixed oxides of Mn, Ni and/or Co, such as $LiMnO_2$, $LiCoO_2$, $LiNiO_2$, $LiMn_{0.5}Ni_{1.5}O_4$ and $LiMnO_4$. Inventive nanoparticles in which the at least one component A is selected from the group of Sn, Ge, Si, Pb, $Co_3O_4$, CuO, $SnO_2$, SnO, NiO, $MoO_2$, $TiO_2$, $Fe_3O_4$, $Fe_2O_3$, $SiO_2$, $ZrO_2$, $MnO_2$ and $RuO_2$ are particularly suitable for use in the anode of electrochemical cells, especially in the anode of lithium ion accumulators; inventive nanoparticles in which the at least one component A is selected from the group of $LiFePO_4$ and Li-containing oxides and mixed oxides of Mn, Ni and/or Co, such as $LiMnO_2$, $LiCoO_2$, $LiNiO_2$, $LiMn_{0.5}Ni_{1.5}O_4$ and $LiMnO_4$, are particularly suitable for use in the cathode of electrochemical cells, especially in the cathode of lithium ion accumulators.

According to the invention, the nanoparticles may comprise a component A, but it is also possible for mixtures of two or more of the metals, semimetals, metal compounds and semimetal compounds useable as component A to be present in the nanoparticles. Typically, the inventive nanoparticles have a mean diameter of 1 to 1000 nanometers, preferably of 100 to 600 nanometers, more preferably of 200 to 400 nanometers, determined by means of TEM (transmission electron microscopy) or SEM (scanning electron microscopy). The values reported are based on the particle diameter after production of the graphene-coated nanoparticles before an electrochemical reaction has taken place, for example the storage of lithium ions or the release of lithium ions from nanoparticles which already comprise lithium ions when produced.

The inventive nanoparticles comprise typically 60 to 97% by weight of at least one component A, preferably 70 to 97% by weight, more preferably 75 to 97% by weight, even more preferably 80 to 97% by weight and especially preferably 90 to 95% by weight of at least one component A, based on the total weight of the nanoparticles. In addition, the inventive nanoparticles comprise typically 3 to 40% by weight of graphene as a coating, preferably 3 to 30% by weight, more preferably 3 to 25% by weight, even more preferably 3 to 20% by weight and especially preferably 5 to 10% by weight of graphene as a coating, based on the total weight of the nanoparticles.

Typically, the inventive nanoparticles comprise 60 to 97% by weight of at least one component A and 3 to 40% by weight of graphene as a coating, preferably 70 to 97% by weight of at least one component A and 3 to 30% by weight of graphene as a coating, more preferably 75 to 97% by weight of at least one component A and 3 to 25% by weight of graphene as a coating, even more preferably 80 to 97% by weight of at least one component A and 3 to 20% by weight of graphene as a coating and especially preferably 90 to 95% by weight of at least one component A and 5 to 10% by weight of graphene as a coating, based in each case on the total weight of the nanoparticles.

In a preferred embodiment of the invention, the nanoparticles consist of 60 to 97% by weight of at least one component A and 3 to 40% by weight of graphene as a coating, preferably of 70 to 97% by weight of at least one component A and 3 to 30% by weight of graphene as a coating, more preferably of 75 to 97% by weight of at least one component A and 3 to 25% by weight of graphene as a coating, even more preferably of 80 to 97% by weight of at least one component A and 3 to 20% by weight of graphene as a coating and especially preferably of 90 to 95% by weight of at least one component A and 5 to 10% by weight of graphene as a coating, based in each case on the total weight of the nanoparticles.

The inventive nanoparticles can be produced by the following process according to the invention, which comprises the steps of:
(a) providing a suspension comprising a suspension medium and nanoparticles with positive surface charge, comprising at least one component A,
(b) adding graphene oxide particles to the suspension from step (a), the graphene oxide particles accumulating on the nanoparticles, and
(c) converting the graphene oxide particles accumulated on the nanoparticles to graphene.

The process for producing the nanoparticles with at least one coating of graphene is based essentially on providing nanoparticles with a positive surface charge in suspension and adding graphene oxide particles. The graphene oxide particles bear an intrinsic negative charge, and so, due to the electrostatic attractive force, the graphene oxide particles accumulate on the nanoparticles with positive surface charge, and graphene oxide-coated nanoparticles are obtained. The nanoparticles are coated or encapsulated by graphene oxide. The second essential step consists in the subsequent reduction of the graphene oxide coating/encapsulating nanoparticles to graphene. This process can thus also be referred to as a process for encapsulating metals, semimetals, metal compounds and semimetal compounds with graphene.

In step a), a dispersion is provided, which comprises a suspension medium and nanoparticles with positive surface charge comprising at least one component A. The positive surface charge of the nanoparticles can be caused by the modification of the surface of the nanoparticles with functional groups and/or by adsorption of at least one cationic surfactant on the surface of the nanoparticles and/or adjustment of the pH of the suspension.

The suspension medium can in principle be selected from all solvents which can disperse graphene oxide; more particularly, the suspension medium can be selected from polar protic and aprotic solvents; for example, it is possible to use alcohols, water, glycols such as ethylene glycol and propylene glycol, acetates such as ethyl acetate, and also N-methylpyrrolidone, dimethylformamide, etc., and mixtures thereof. Preferably in accordance with the invention, the suspension comprises an aqueous suspension medium.

When the positive surface charge of the nanoparticles is caused by modification of the surface of the nanoparticles by functional groups, the functional groups are selected from positively charged functional groups and precursors of positively charged functional groups; the functional groups are preferably selected from amino groups and ammonium groups, more preferably from $NR_2$ and $NR_3^+$, where each R is independently selected from H, $C_1$-$C_6$-alkyl and $C_1$-$C_6$-hydroxyalkyl, and where one or more R may be bonded to more than one $NR_2$ and/or $NR_3^+$ group.

The modification of the surface of the nanoparticles with functional groups is known to those skilled in the art. For the modification, it is possible to use, for example, aminoalkyloxysilyl compounds such as N-[3-(trimethoxysilyl)propyl]ethylenediamine and aminopropyltrimethoxysilane. Such a process is described, for example, in B. Lee et al., Microporous Mesoporous Mater. 122 (2009), 160 and J. S. Bridel et al. Chem. Mater. 22 (2010) 1229. Metal and semimetal particles are typically first oxidized cautiously on their surface in the presence of air or in water at high temperatures (for example 100° C.) or with oxygen plasma, in order to form an outer oxide layer on the particles, and then, for example, functionalized with the above-described aminoalkoxysilyl compounds (Hu Y. S., et al., Angew. Chem. Int. Ed. 2008, 47, 1645; Li J., Polymer 2006, 47, 7361). The amino groups introduced can be converted to positively charged ammonium groups by adjusting the pH.

The precursors of the positively charged functional groups can be converted to positively charged functional groups by further conversion or by adjusting the pH. The pH can be adjusted, for example, by adding HCl or ammonia.

Some nanoparticles, especially the metal oxides, may bear a positive surface charge even without functionalization; this depends on the particular isoelectric point and the pH which exists in the suspension, such that a positive surface charge on the nanoparticles can be caused by adjusting the pH below the isoelectric point. This can be accomplished, for example, by addition of organic or inorganic acids such as HCl or $H_2SO_4$.

When the positive surface charge of the nanoparticles is caused by adsorption of at least one cationic surfactant on the surface of the nanoparticles, it is preferred in accordance with the invention that the at least one cationic surfactant is selected from the group of the quaternary ammonium compounds, more preferably from $C_nH_{2n+1}N(R)_3Hal$ where n=12, 14, 16 and 18, Hal=Cl and Br and R=$CH_3$ or $C_2H_5$, where each R may be the same or different; especially preferred are cetyltrimethylammonium chloride, cethyltrimethylammonium bromide and cetyltrimethylammonium bromide.

Nanoparticles of metals, semimetals, metal compounds and semimetal compounds can be produced by processes known to those skilled in the art. For example, the production can be effected chemically by the sol-gel process in a solvent; nanoparticles can be produced by self-assembly growth on surfaces or by means of templates; they can be obtained in plasma or with the aid of microemulsion techniques. One possible process is described, for example, in Cao A. M., et al, J. Phys. Chem. B, 2006, 110, 15858. Depending on the chemical nature of the nanoparticles desired, one process or another has better suitability. Before use in step (a) of the process according to the invention, the nanoparticles can also be surface-modified and/or worked up, for example washed, dried and/or calcined.

The suspension comprising a suspension medium and nanoparticles with positive surface charge is produced by mixing the suspension medium with the nanoparticles and optionally one or more cationic surfactants, it being possible, for example, to employ ultrasound, stirring, shaking and further processes known to those skilled in the art. It is possible to use stirring, grinding and dispersing apparatus known to those skilled in the art, such as an Ultra-Turrax® stirrer, ultrasound finger, etc.

The suspension typically comprises nanoparticles comprising at least one component A, preferably 0.1 to 2% by weight and more preferably 0.5 to 1% by weight of nanoparticles comprising at least one component A, based on the total weight of the suspension.

When the positive surface charge of the nanoparticles is caused by adsorption of at least one cationic surfactant on the surface of the nanoparticles, typically 0.1 to 1% by weight of at least one cationic surfactant, preferably 0.2 to 0.6% by weight and more preferably 0.2 to 0.4% by weight of at least one cationic surfactant is used, based on the total weight of the suspension.

In step (b) of the process according to the invention, graphene oxide particles are added to the suspension.

The preparation of graphene oxide is known to those skilled in the art. Graphene oxide can be prepared, for example, from graphite oxide, which is subsequently split up (exfoliated). Graphite oxide and graphene oxide are negatively charged due to the oxygen-functional groups present therein, and so graphite oxide can be split up into graphene oxide in a polar solvent. This can be promoted, for example, by use of ultrasound. Graphite oxide is hydrophilic. Exfoliated graphene oxide forms very well-dispersed aqueous suspensions.

The production of graphite oxide particles is likewise known to those skilled in the art; typically, graphite oxide is prepared by oxidation of graphite. The oxidation incorporates oxygen atoms into the graphite; in particular, alcohol, epoxy, carbonyl and carboxyl groups are formed. These groups widen the distances between the individual layers, and the layers can be separated more easily from one another. The oxidized graphite layers additionally become more hydrophilic and better water-dispersible by virtue of the oxygen-containing groups.

Oxidized graphite is prepared typically by treating graphite with an oxidizing agent and an acid, especially a strong acid. The oxidizing agents used are especially chlorates and permanganates; the acids used are especially sulfuric acid and nitric acid.

L. Staudenmaier, Ber. Dt. Chem. Ges. 31, (1898), 1481, and L. Staudenmaier, Ber. Dt. Chem. Ges. 32, (1899), 1394, describe the preparation of oxidized graphite, referred to therein as graphitic acid, by reaction of graphite with potassium chlorate in the presence of fuming nitric acid and concentrated sulfuric acid.

W. S. Hummers, R. E. Offeman, J. Am. Chem. Soc. 80 (1958), 1339, describe the preparation of oxidized graphite by reaction of graphite with sodium nitrate and potassium permanganate in the presence of sulfuric acid.

It is also possible to use expandable graphite as a precursor for the preparation of the oxidizing graphite. In this case, the graphite is expanded in the first step. The product obtained is then ground, for example, in a ball mill. The last step is the chemical modification as described above, by thermal oxidation or by oxidation in the presence of sulfuric acid.

Typically, the graphene oxide is added as a suspension in step (b), preferably as a suspension in an aqueous suspension medium, especially as an aqueous suspension.

The concentration of graphene oxide particles after addition of the graphene oxide particles to the suspension is typically 0.01 to 0.5% by weight, preferably 0.02 to 0.4 and more preferably 0.05 to 0.25% by weight, based on the weight of the mixture obtained in step (b). Due to the negative charge of the graphene oxide particles, they accumulate on the positively charged nanoparticles. The addition of the graphene oxide particles is typically followed by a wait for a certain time in order that the graphene oxide particles can accumulate on the surface of the nanoparticles. For this purpose, the mixture can be stirred, for example, for 15 minutes to 2 hours.

In step (c), the graphene oxide particles accumulated on the nanoparticles are converted to graphene. This can be accomplished, for example, by addition of one or more reducing agents to the mixture obtained from step (b). Examples of suitable reducing agents are inorganic reducing agents such as hydrazine, $NaBH_4$ and organic reducing agents such as hydroquinone, dimethylhydrazine or N,N-diethylhydroxylamine. Preference is given to using hydrazine as the reducing agent.

The graphene oxide particles accumulated on the surface can also be converted to graphene by thermal treatment. For this purpose, the nanoparticles with the accumulated graphene oxide particles are removed from the suspension medium, optionally washed and dried, and converted to graphene by heating the graphene oxide-coated nanoparticles to at most 600° C. in inert gas atmosphere for at least 1 minute. The coated graphene oxide particles are more preferably heated for at least 30 minutes and more preferably for 1 hour under inertgas atmosphere. The heating is performed typically for not longer than 12 hours, preferably not longer than 6 hours. The temperature is preferably 300° C. to 500° C.

The invention also provides the above-described nanoparticles producible by the above-described process, comprising at least one component A and at least one coating of graphene.

The present application further provides for the use of the inventive nanoparticles as material which stores and/or releases lithium ions, for example in the electrodes of electrochemical cells, especially in lithium ion accumulators, and for the use of the inventive nanoparticles in supercapacitors. The inventive nanoparticles can be used as material which stores and/or releases lithium ions both in the anode and in the cathode of lithium ion accumulators and supercapacitors. Nanoparticles comprising Li-containing oxides and mixed oxides of Mn, Ni and/or Co, such as $LiMnO_2$, $LiCoO_2$, $LiNiO_2$, $LiMn_{0.5}Ni_{1.5}O_4$ and $LiMnO_4$ and/or $LiFePO_4$, as component A are particularly suitable as cathode-active material in lithium ion accumulators; nanoparticles comprising Sn, Ge, Si, Pb, $Co_3O_4$, CuO, NiO, $MoO_2$, $TiO_2$, $SnO_2$, SnO, $Fe_3O_4$, $SiO_2$, $ZrO_2$, $Fe_2O_3$, $MnO_2$ and/or $RuO_2$ as component A are particularly suitable as anode-active material for lithium ion accumulators.

The present invention further provides electrochemical cells and supercapacitors comprising the inventive nanoparticles, especially as material which stores and/or releases lithium ions in the electrodes. Preference is given to electrochemical cells which comprise the inventive nanoparticles in the anode and/or cathode, especially as anode-active and/or cathode-active material, and very particular preference to lithium ion accumulators which comprise the inventive nanoparticles in the anode and/or cathode. The electrodes may comprise further customary components known to those skilled in the art, such as binders, further assistants for conductivity such as carbon black, and the like.

Lithium ion accumulators are known to those skilled in the art from the prior art. The cathodes used in lithium ion accumulators are frequently lithium metal oxides of the spinel type such as $LiCoO_2$, $LiNiO_2$, $LiFePO_4$ or $LiMn_2O_4$. In addition, the lithium ion accumulators comprise an anhydrous electrolyte, typically an aprotic solvent such as ethyl carbonate or dioxolane, and mixtures of such solvents, and lithium salts dissolved therein, such as $LiPF_6$. In addition, a lithium ion accumulator may comprise a separator which separates the anode space and the cathode space, but is pervious to lithium ions.

The invention is illustrated hereinafter with reference to examples:

EXAMPLE 1

Graphene-Coated $Co_3O_4$ Nanoparticles (Inventive)

Cobalt oxide was prepared by the reaction of cobalt acetate with ethylene glycol in the presence of polyvinylpyrrolidone (PVP), as described in A. M. Cao et al., J. Phys. Chem. B. 100 (2006) page 15858. For this purpose, 2.24 g of Co(CH$_3$COO)$_2$.4H$_2$O and 1.5 g of mM PVP (M$_w$=58 000) were added to 200 ml of ethylene glycol to obtain a turbid solution. The mixture was stirred with a magnetic stirrer and heated to 170° C. under an argon atmosphere. After 30 minutes, the product was removed in several centrifugation/dispersion cycles with ethanol, and calcined at 500° C. for 2 hours.

The cobalt oxide obtained was suspended in 200 ml of dry toluene with the aid of ultrasound. After 30 minutes, 20 ml of aminopropyltrimethoxysilane were added to the suspension and the mixture was heated under reflux and an argon protective gas atmosphere for 12 hours in order to obtain NH$_2$-functionalized cobalt oxide. 7.5 mg of a suspension of graphene oxide particles in water (0.25 mg/ml) were added dropwise while stirring to 30 ml of a suspension of NH$_2$-functionalized cobalt oxide (1 mg/ml) in water. After 1 hour, 1 ml of hydrazine (35% by weight) was added in order to reduce the graphene oxide to graphene, so as to obtain graphene-coated cobalt oxide.

The graphene-coated Co$_3$O$_4$ nanoparticles produced in this way were examined by means of x-ray scattering, thermogravimetry and electron microscopy. The x-ray scattering showed that the Co$_3$O$_4$ nanoparticles have been coated with a single graphene layer. With the aid of the thermogravimetry analysis, a Co$_3$O$_4$ content of the nanoparticles of 91.5% was determined. According to electron microscopy, the diameter of the graphene-coated Co$_3$O$_4$ nanoparticles is about 300 nm.

EXAMPLE 2

Measurement of Capacity

The electrochemical studies were carried out in standard R2032 button cells. The working electrodes were produced by mixing the graphene-coated Co$_3$O$_4$ nanoparticles from example 1, Co$_3$O$_4$, and Co$_3$O$_4$ mixed mechanically with graphene (91.5% by weight of Co$_3$O$_4$ and 8.5% by weight of graphene). For this purpose, the particular active materials were mixed with carbon black and polyvinylidene fluoride (PVDF) in a weight ratio of 80 (active material): 10 (carbon black): 10 (PVDF), and painted onto copper foil (99.6%, Goodfellow). The counter electrode used was lithium foil. The electrolyte consisted of a one molar LiPF$_6$ solution in ethylene carbonate (EC)/dimethyl carbonate (DMC) (volume ratio of 1:1; Industries Ltd). The cells were assembled in an argon-filled glovebox.

The charge/discharge capacities were measured at a current density of 74 mAh/g. The results of the first thirty charge/discharge cycles are shown in table 1; table 2 shows the capacities of the electrodes comprising the inventive nanoparticles from example 1 in a long-term test.

TABLE 1

| | Capacity [mAh/g] | | |
|---|---|---|---|
| Cycles | Example 1 (inventive), 91.5% by weight of Co$_3$O$_4$ | Co$_3$O$_4$ (uncoated nanoparticles produced analogously to example 1) | Mechanical mixture of Co$_3$O$_4$ (uncoated nanoparticles produced analogously to example 1) |
| 1 | 1147 | 764 | 832 |
| 2 | 1102 | 695 | 820 |
| 5 | 1085 | 605 | 826 |
| 10 | 1077 | 536 | 785 |
| 20 | 1087 | 453 | 693 |
| 30 | 1081 | 398 | 554 |

The theoretical capacity of graphite alone is 372 mAh/g. The theoretical capacity should, according to the "double layers" lithium storage mechanism of graphene, be 744 mAh/g. According to literature (G. Wang, et al, Carbon, 2009, 47, 2049), the actual value of the capacity of graphene is about 500 mAh/g. The inventive Co$_3$O$_4$ nanoparticles with graphene coating thus exhibit, as anode-active material, a reversible capacity which is far above the capacities of graphite and graphene alone, Co$_3$O$_4$ alone and the mechanical mixture of Co$_3$O$_4$ and graphene with the same proportions of Co$_3$O$_4$ and graphene as in the inventive nanoparticles.

TABLE 2

| | Example 1 (inventive), 91.5% by weight of Co$_3$O$_4$ Capacity [mAh/g] | |
|---|---|---|
| Cycles | Charge | Discharge |
| 1 | 1681 | 1147 |
| 10 | 1101 | 1077 |
| 20 | 1105 | 1087 |
| 30 | 1101 | 1081 |
| 40 | 1146 | 1128 |
| 50 | 1162 | 1141 |
| 60 | 1154 | 1135 |
| 70 | 1142 | 1114 |
| 80 | 1111 | 1088 |
| 90 | 1093 | 1068 |
| 100 | 1070 | 1050 |
| 110 | 1058 | 1040 |
| 120 | 1045 | 1023 |
| 130 | 1036 | 1014 |

The capacity of an electrode comprising the inventive Co$_3$O$_4$ nanoparticles with graphene coating is at an almost unchanged high level even after 130 charge/discharge cycles.

The invention claimed is:
1. Nanoparticles comprising:
   at least one component A selected from the group consisting of a metal, a semimetal, and metal compound and a semimetal compound; and
   at least one coating of graphene.
2. The nanoparticles according to claim 1, comprising:
   60 to 97% by weight of the at least one component A; and
   3 to 40% by weight of the graphene coating, based on a total weight of the nanoparticles.
3. The nanoparticles according to claim 1, which have a mean diameter of 1 to 1000 nm.
4. The nanoparticles according to claim 1, wherein the at least one component A stores and/or releases lithium ions.
5. The nanoparticles according to claim 1, wherein the at least one component A is selected from the group consisting of Sn, Ge, Si, Pb, Co$_3$O$_4$, CuO, SnO$_2$, SnO, NiO, MoO$_2$, TiO$_2$, HfO$_2$, ZrO$_2$, ZnO, Al$_2$O$_3$, SiO$_2$, Fe$_3$O$_4$, Fe$_2$O$_3$, LiFePO$_4$, MnO$_2$, RuO$_2$, a Li-containing oxide and a mixed oxide of Mn, Ni and/or Co.
6. A process for producing the nanoparticles according to claim 1, the process comprising:
   providing a suspension comprising a suspension medium and nanoparticles with a positive surface charge, comprising the at least one component A;
   adding graphene oxide particles to the suspension, the graphene oxide particles being accumulating on the nanoparticles; and
   converting the graphene oxide particles accumulated on the nanoparticles to graphene.
7. The process according to claim 6, wherein the positive surface charge of the nanoparticles is caused by modification of the surface of the nanoparticles with functional groups and/or adsorption of at least one cationic surfactant on the surface of the nanoparticles and/or adjustment of the pH of the suspension.

8. The process according to claim 7, wherein the functional groups are selected from positively charged functional groups and precursors of positively charged functional groups.

9. The process according to claim 7, wherein:
the functional groups are selected from the group consisting of $NR_2$ and $NR_3^+$; and
each R is independently selected from the group consisting of H, $C_1$-$C_6$-alkyl and $C_1$-$C_6$-hydroxyalkyl, such that one or more R is optionally bonded to more than one $NR_2$ and/or $NR_3^+$ group.

10. The process according to claim 7, wherein the at least one cationic surfactant is a quaternary ammonium compound.

11. The process according to claim 6, wherein the suspension comprises an aqueous suspension medium.

12. The process according to claim 6, wherein the graphene oxide particles are converted to the graphene by addition of at least one reducing agent.

13. The process according to claim 6, wherein the graphene oxide particles are converted to the graphene by heating the graphene oxide-coated nanoparticles to at most 600° C. in inert gas atmosphere for at least 1 min.

14. A method for storing and/or releasing lithium ions in an electrochemical cell or in a supercapacitor, the method comprising adding the nanoparticles according to claim 1, as a material which stores and/or releases lithium ions, to an electrochemical cell or to a supercapacitor.

15. An electrochemical cell or a supercapacitor, comprising the nanoparticles according to claim 1.

16. The nanoparticles according to claim 1, wherein the at least one component A is selected from the group consisting of $LiMnO_2$, $LiCoO_2$, $LiNiO_2$, $LiMn_{0.5}Ni_{1.5}O_4$ and LiMnO.

* * * * *